United States Patent [19]
Bennet et al.

[11] Patent Number: 5,381,064
[45] Date of Patent: Jan. 10, 1995

[54] PRINT WHEEL MOTOR FOR ENCODER

[75] Inventors: Richard I. Bennet, Crewe; Ian Gibb, Nantwich, both of United Kingdom

[73] Assignee: Macon Management & Design Limited, United Kingdom

[21] Appl. No.: 4,100

[22] Filed: Jan. 13, 1993

[30] Foreign Application Priority Data

Jan. 15, 1992 [GB] United Kingdom ............... 9200792

[51] Int. Cl.⁶ ............... H02K 24/00; H03M 1/22
[52] U.S. Cl. ............... 310/49 R; 310/68 B; 310/DIG. 3; 101/93.29
[58] Field of Search ............... 310/49 R, 68 R, 68 B, 310/273, DIG. 3; 101/93.29, 93.42, 93.46

[56] References Cited

U.S. PATENT DOCUMENTS

| | | | |
|---|---|---|---|
| 3,588,888 | 6/1971 | Harden | 340/378 R |
| 4,246,643 | 1/1981 | Hubbard | 364/900 |
| 4,358,694 | 11/1982 | Grundland | 310/49 R |
| 4,552,065 | 11/1985 | Billington et al. | 101/93.33 |
| 4,709,630 | 12/1987 | Wilkins et al. | 101/93.22 |
| 4,893,121 | 1/1990 | Gasiunas | 341/15 |
| 4,899,072 | 2/1990 | Ohta | 310/49 R |
| 4,963,775 | 10/1990 | Mori | 310/49 R |
| 5,154,118 | 10/1992 | Doery et al. | 101/91 |
| 5,230,283 | 7/1993 | Kobayashi | 101/93.3 |

FOREIGN PATENT DOCUMENTS

| | | |
|---|---|---|
| 565961 | 12/1944 | United Kingdom . |
| 802955 | 10/1958 | United Kingdom . |
| 866311 | 4/1961 | United Kingdom . |
| 2016377 | 1/1982 | United Kingdom . |
| 2018684 | 3/1982 | United Kingdom . |

Primary Examiner—Kristine L. Peckman
Assistant Examiner—D. R. Haszko
Attorney, Agent, or Firm—Salter & Michaelson

[57] ABSTRACT

A plurality of stepper motors, each of which comprises a stator assembly and a rotor, are axially aligned to form with a control system an encoder for use in a printing apparatus. The rotors constitute print wheels which support different print characters. The stator assembly of each motor only extends above a part of the circumference of the associated rotor. This enables the axial extent of the print wheels to be reduced, A sensor arrangement is provided to enable the home position of each wheel to be determined. In operation, the control system receives desired print character information and rotates the associated rotor to the correct position for printing to take place. Once all rotors have been rotated to their desired position for printing, printing can then take place. The arrangement enables the printing process to run faster than previously.

11 Claims, 6 Drawing Sheets

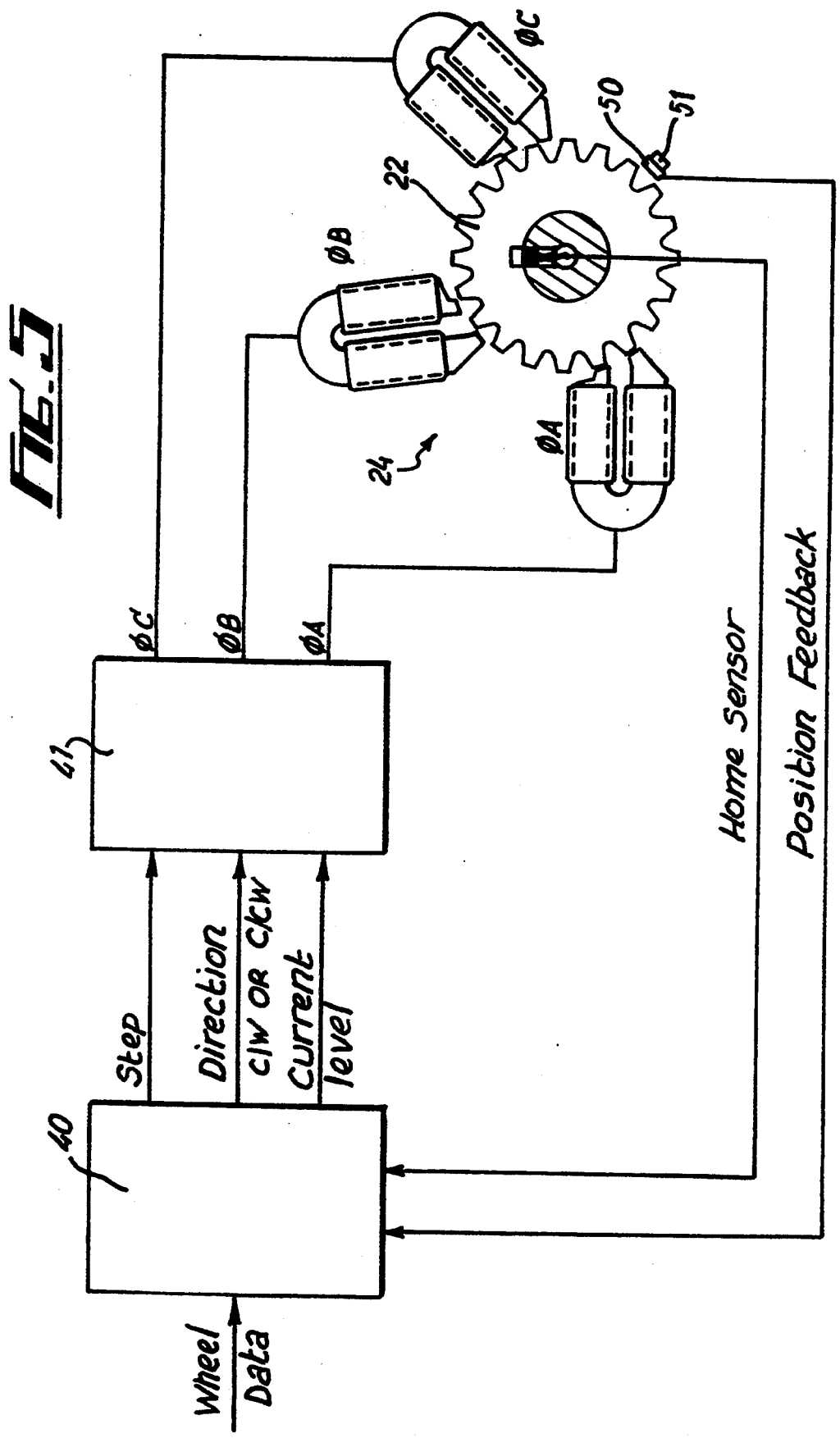

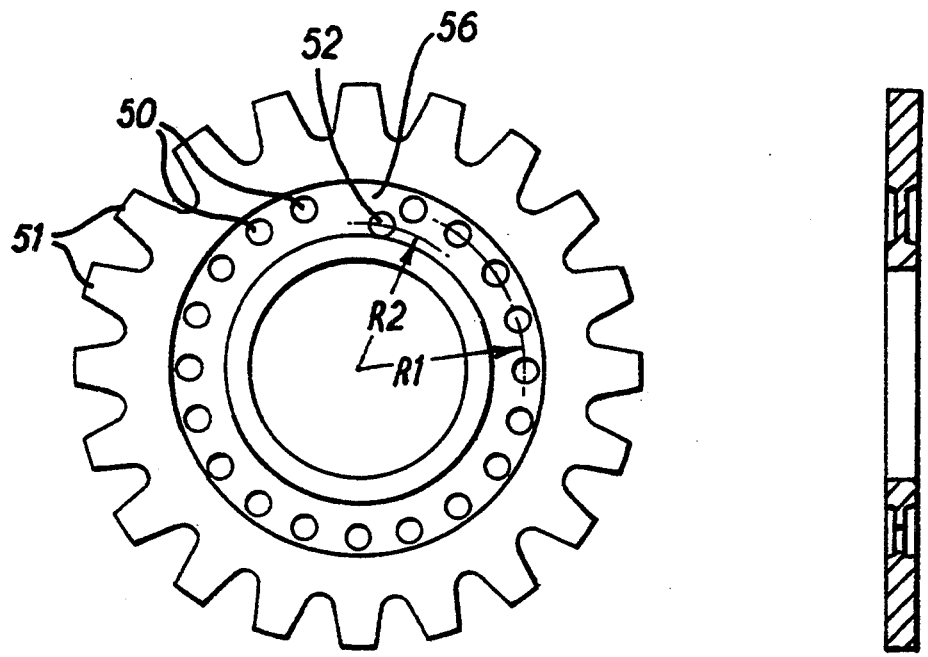
FIG. 6      FIG. 6a
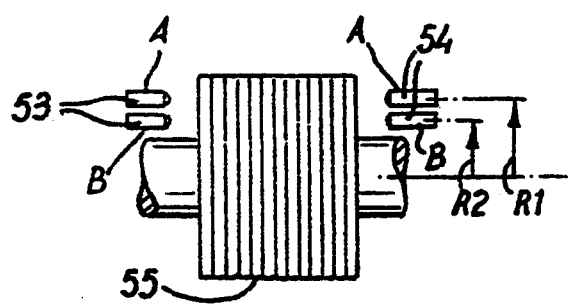
FIG. 7

PRINT WHEEL MOTOR FOR ENCODER

The present invention relates to a motor.

The motor is intended particularly, but not exclusively, for use in a document encoding mechanism.

within the banking industry, there are many instances where documents must be "encoded". This is the process whereby a codeline is printed along the bottom of the document in a form which is machine readable to facilitate the subsequent automated bank clearing processes, One of the main requirements on a check, for example, is to encode the amount for which the check has been written. Once this part of the codeline has been added, the rest of the process for sorting and clearing the checks can be automated.

There is considerable demand for any technology which would help speed up the clearing processes while retaining .the need for absolute accuracy and security. The amount encoding process is one of the limiting factors on the speed of the overall clearing process. Within the industry, the target which is being sought is encoding at a rate of 1000 documents per minute (approximately 17 documents per second).

The fastest encoders currently available use a concept known as "printing on the fly" which means printing on the document without stopping it. This is achieved using a row of print wheels with characters engraved around the periphery. Each wheel can be individually driven to present the required character at the print position. A hammer is positioned beneath the wheels. On the approach of a document, the hammer strikes the paper against an inked ribbon and the print wheels to form a line of print.

The main problem to be solved is how to drive the print wheels quickly and accurately to present the required characters at the print position ready for the arrival of the next document. Known encoders of this type, such as described in U.S. Pat. Ser. No. 4,709,630, use stepper motors coupled to the print wheels via a mechanical drive train. Due to the positional inaccuracies introduced by this drive train, an "alignment bar" is provided which is inserted into the gearform in the print wheels to align accurately the characters just prior to the hammer strike. The insertion and retraction of this alignment bar occupies a significant proportion of the cycle time which slows the encoding speed.

According to one aspect of the present invention there is provided a motor comprising a stator assembly and a rotor in which the rotor carries a plurality of spaced members forming an integral part of the rotor, the members being for use in a process and being movable into a selected position in accordance with process requirements.

In a preferred embodiment of the invention, the motor is a stepper motor and forms part of an encoder for use in a printing apparatus and process. The encoder comprises one or more print wheels (the or) each of which forms a rotor of a respective stepping motor. The spaced members constitute carriers supporting different print characters. To reduce the axial extent of a plurality of print wheels and facilitate the introduction of the parts of the printing apparatus, the stator assembly of each motor only extends over a part of the circumference of the associated rotor and the individual stator windings of adjacent motors are interleaved around the remaining circumference. A control system comprising control electronics and drive electronics receives desired print character information and rotates the associated rotor to the correct position for printing to take place. The printing process employed is an impact printing process. Once all of the rotors have been rotated to their desired position for printing, a hammer pushes the document to be encoded and an ink ribbon against print characters on the rotors then located at the print position. The operation of the printing mechanism may be synchronised with the feed of the documents to be encoded.

According to another aspect of the present invention, there is provided apparatus comprising a plurality of elements arranged in a row, each element being movable relative to the others into one of a plurality of positions in which a processing member of the element is disposed at a processing point, one of that plurality of positions being designated a home position, each element being formed such that a sensor beam may be transmitted through aligned formations in order to determine the home position of each element.

In a preferred embodiment, the elements are wheels and the formations comprise slots, recesses or apertures. Each wheel comprises a plurality of such formations at equidistantly spaced positions around the wheel at a particular radius except for one position, known as the blank position, where the formation is missing. Adjacent this position but on a different radius is a further formation known as a home formation. Two position sensors are provided. Each sensor comprises an emitter and a receiver disposed on opposite sides respectively of the row of wheels. The sensors are disposed on the respective above mentioned radii. The wheels are turned until the sensor on the first mentioned radius can see through all of the wheels. Each wheel in turn is then turned until the blank position obscures the line of sight of that sensor. The relative positions of the blank and home positions for each wheel are known and each wheel may then be turned to its home position. The other sensor is employed to check that all wheels are at the home position.

In order that the invention may be more clearly understood, one embodiment thereof will now be described by way of example, with reference to the accompanying drawings, in which:

FIG. 5 is a block circuit diagram showing the association of a control system with the printing apparatus of FIG. 2.

FIG. 6 shows a diagrammatic end view of a modification of part of the apparatus of FIGS. 2 to 4, FIG. 7 is a diagrammatic front elevational view of the modification of FIG. 6, and FIGS. 8a, 8b and 9 correspond respectively to FIGS. 4a, 4b and 5 and show an alternative embodiment to the embodiment shown in those figures.

The embodiment to be described is within the field of security printing. In bank clearing processes there is a need to "encode" checks and other financial documents with machine readable characters to facilitate subsequent processing. For reasons of economy and efficiency, the higher the speed that encoding is performed the better. That speed is limited by the time taken to arrange for the print wheels which are to print the machine readable characters to be selected and correctly positioned for printing to be effected.

Figure 1:
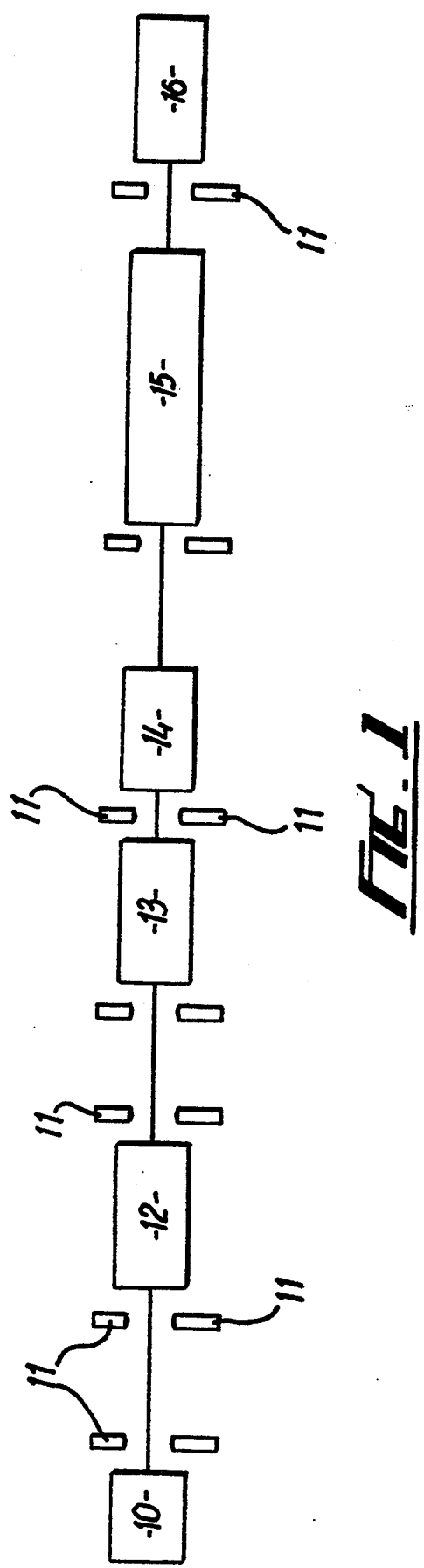
FIG. 1 is a block circuit diagram of a system for an impact printing process.

The printing machine or-encoder is located on a track which has means for transporting documents. Commonly, these are either vacuum tracks or tracks consisting of drive rollers and idlers. A block circuit diagram of a typical printing system showing the track that a document follows is shown in FIG. 1. Documents are passed down this track from a feed unit and on to subsequent processing and output stages. Sensors 11 are placed at intervals along the track which enable the control system to monitor the progress of each document. Those sensors placed just prior to the encoder are operative to synchronize the printing process such that this occurs coincidentally with the arrival of the document. The subsequent processing stages comprise a data capture stage 12, encoder stage 13, reader stage 14 and other processing stages 15. The output stage is referenced 16.

The data capture stage may comprise an automatic reader, which may be optical or magnetic or both, to identify documents to be encoded by reading an existing codeline on the document. The data to be captured may also be handwritten. Reader stage 14 is operative to verify that the correct information has been printed on the document. The other processing stages 15 may comprise means for endorsing each document on the front and/or the back, for example by means of a stamp, or means for printing, for example by an ink jet, an identifier on each document, or a camera for photographing each document.

Figure 2:
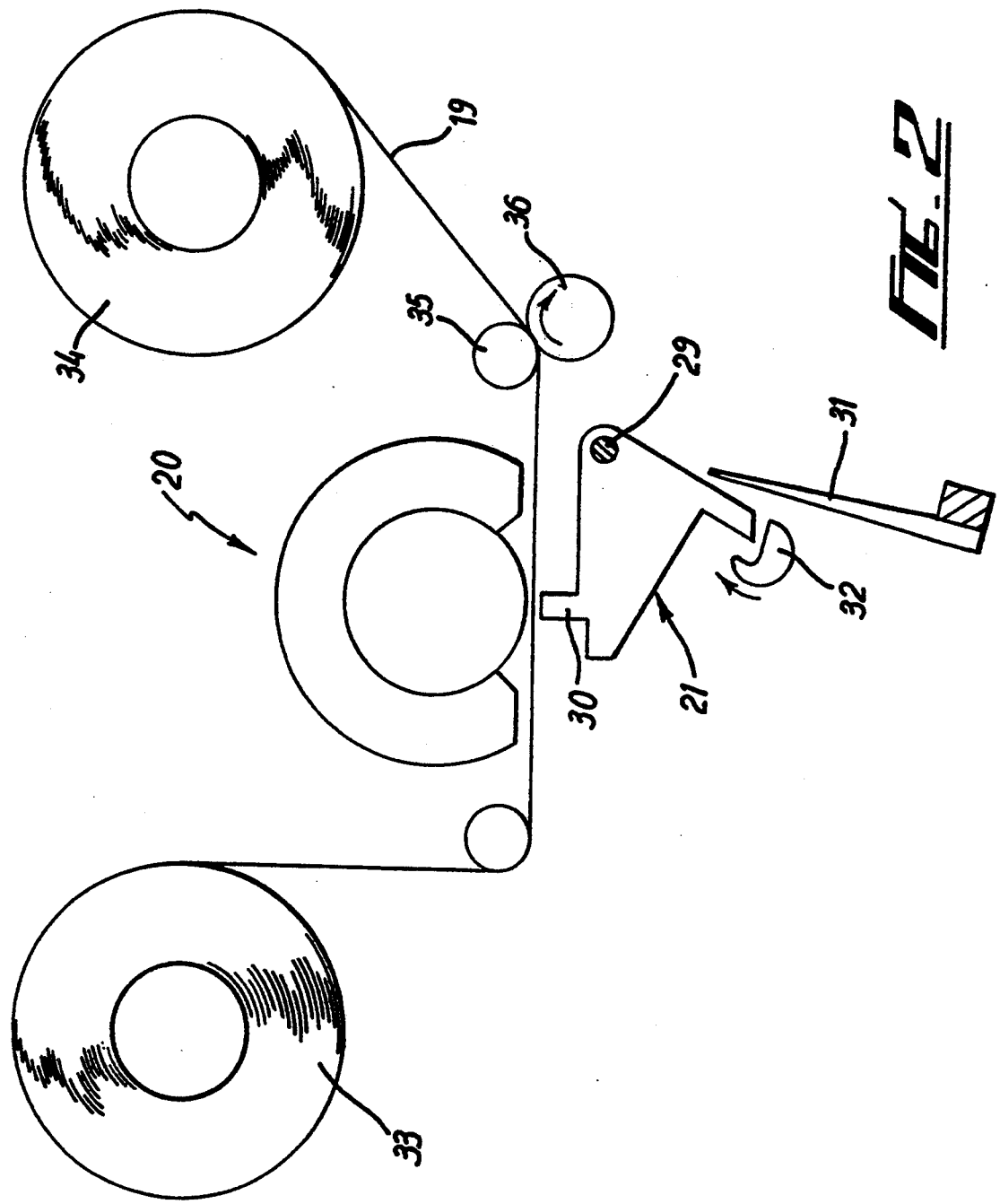
FIG. 2 is a diagrammatic view of an apparatus incorporating the invention.

Referring to FIG. 2, the encoder itself comprises print wheel and hammer systems generally referenced 20 and 21 respectively means for mounting and incrementing an inked ribbon 19 and a control system comprising control electronics 40 and drive electronics 41 (see FIG. 5).

Figure 3:
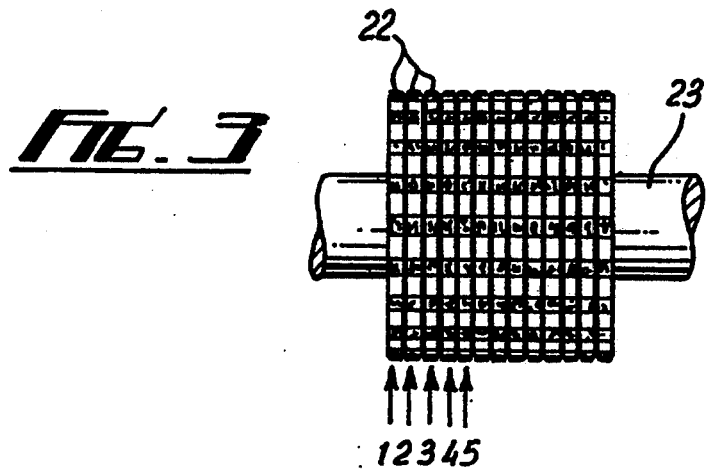
FIG. 3 is a front elevational view of a wheelset forming part of the apparatus of FIG. 2.

Referring to FIGS. 3 and 4, the print wheel system comprises a row of print wheels 22 mounted on a common shaft 23. Each print wheel comprises twenty character carriers 26 equidistantly spaced around the wheels circumference. A sensor 25 is provided on each wheel 22 to provide an indication of a known "home" position. Once the system has found this home position during an initializing sequence, the wheel can be driven to present any desired character at the print position P.

Figure 4A:
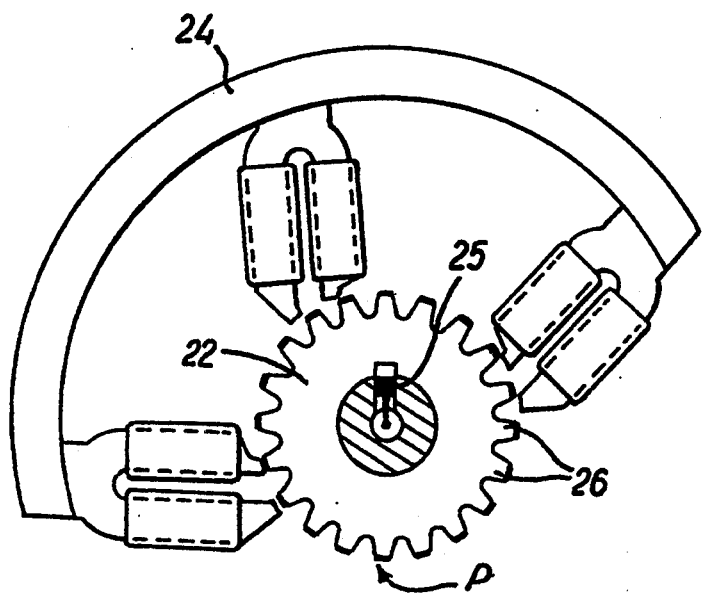
FIG. 4a is an end elevational view of the odd wheels and stator assembly of the wheelset of FIG. 3.
Figure 4B:
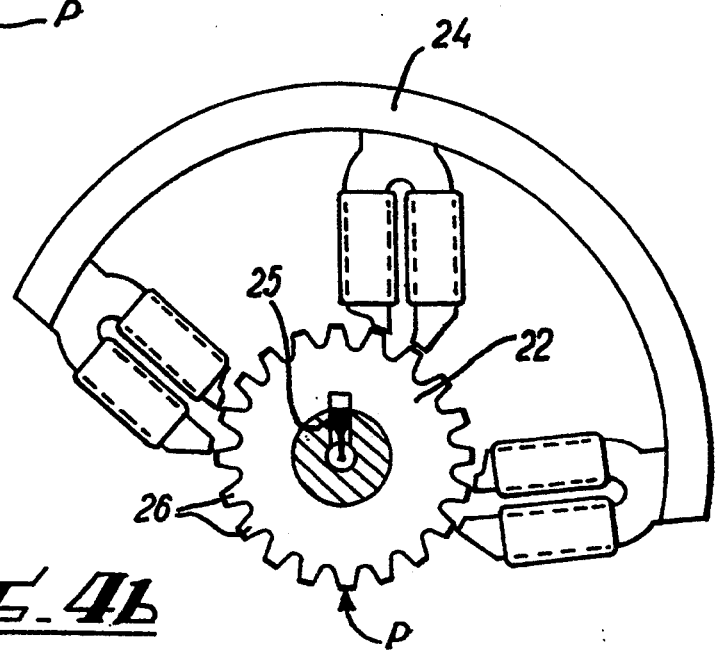
FIG. 4b is an end elevational view of the even wheels and stator assembly of the wheelset of FIG. .3

Referring additionally to FIG. 5, each print wheel 22 forms the rotor of a stepping motor. This could be a variable (switched) reluctance, permanent magnet, or hybrid stepper motor. The stator assembly 24 of each motor typically carries 3 individual sets of windings, $\phi A$, $\phi B$ and $\phi C$. The windings are energized by the control system drive electronics which can control the magnitude of the current in the windings. Current direction would also need to be controlled in the case of permanent magnet and hybrid arrangements. The windings are energized in a sequence, causing the rotor to move, thus presenting the required character at the print position P. The sequence can be reversed to move the print wheel 22 backwards. The stator assembly of each motor extends circumferentially around only a part of the rotor and the individual stator windings of adjacent rotors interleaved as shown in FIGS. 4a and 4b to provide room for the stator windings displaced from the print position P. Thus reading from the left hand end of the wheel set as shown in FIG. 3, the stator windings of the odd numbered wheels are disposed as shown in FIG. 4a and the stator windings of the even numbered wheels are disposed as shown in FIG. 4b.

The hammer system 21 (see FIG. 2) consists of a single hammer 30 pivotally mounted at 29 which strikes all wheels 22 simultaneously to generate a line of characters. The hammer is loaded against a spring 31 by means of a motor driven snail type cam 32. Rotation of the cam 32 causes the hammer 30 to be released. Under the action of its spring 31, the hammer 30 strikes the paper of the document against the ribbon and the print wheels 22. The cam 32 then re-engages with the hammer 30 to load it against its spring 31 in readiness for the next print.

The ribbon system consists of feed and take-up spools 33 and 34 and a means for incrementing the ribbon 19 through the print position P. The increment is achieved by directing the ribbon 19 through a pair of rollers 35 and 36, one of which is driven such that the ribbon 19 is pulled through by an amount just greater than the print height after each print. This incrementing roller 36 can either be mechanically linked to the hammer cam 32 or can be independently motor driven.

The control system in FIG. 5 takes the desired print character information for each rotor. The control electronics 40 generates the correct rotor direction clockwise (C.W.) or counter-clockwise (C.C.W.) and correct number and current level of step pulses to move the rotor to the required character position for printing. These pulses are fed to the drive electronics 41 which then energises the stator winding in the appropriate way. At startup, or during operation, the control system will step the rotor round to find the home position. The relative move to any character is then known. The sequence in which the windings are energized would typically be AB, BC, CA, etc. This would result in a 6 degree movement per step in the sequence, for the diagram shown in FIG. 5. In addition by varying the current magnitude in discrete steps then ministeps within each step can be created. Typically there would be 4 to 8 ministeps per step resulting in 240 to 480 mini-steps per revolution of the rotor. The step sequence would normally give an approximately triangular velocity profile, to achieve the minimum time to move a wheel the required distance. The last few steps in a sequence may be positioned at specific time intervals, determined by the natural frequency of the stepper motor, which will minimise the time taken for the rotor to come to a standstill at the end of a step sequence.

On initializing the system, the hammer 30 is loaded against its spring 31, the ribbon drive system presents an unused portion of ribbon 19 at the print position, and the wheels 22 are driven to their "home" position.

Shortly before the arrival of the first document, data is sent to the encoder control system to indicate the characters to be printed. The wheels 22 are then driven to the appropriate positions. When the document is sensed just prior to the encoder, the cam 32 is driven to release the hammer 30. This then is forced up by its spring 31 and pushes the paper of the document against the inked ribbon 19 and the print wheels to form a print. The time of release of the hammer may be synchronized with the speed of the track system such that the print occurs at the correct position on the document without the need to halt the document at the encoder by means of a stop mechanism on the track. This technique of printing without stopping the document with external mechanisms is known as "printing on the fly" as mentioned earlier.

After the hammer strike, the cam 32 continues to rotate to re-engage with the hammer 30 and load it against its spring 31. At the same time, the ribbon 19 can be incremented to present an unused section at the print position P and, on receipt of data for the following document, the wheels 22 can be driven round to present the required condition to receive the next document.

Forming the print mechanism as parts of the stepper motors as described above facilitates the production of an accurate high speed encoding arrangement. The arrangement is much simpler than current known arrangements producing a saving in parts and expense.

Owing to space constraints and environmental problems, the home sensing arrangement described above may be difficult to apply. Also, as a sensor is required for each wheel a large number of sensors are required and this may lead to reliability problems. In an alternative arrangement shown in FIGS. 6 and 7, each print wheel is provided with a series of holes 50 corresponding to respective character positions 51. In all but one position, these holes 50 are on a common radius R1. In one position 52 (home), the hole 50 is radially offset, and could also be angularly offset. Two optical sensors are provided, one (Sensor A) is arranged On the radius of the main set of holes (R1) and the other (Sensor B) on the radius of the "home hole" (R2). Each sensor consists of an emitter 53 placed at one end of the row of wheels 55 and a receiver 54 placed at the other. The displaced hole 50 produces a blank position 56 at radius R1.

On initializing, sensor A may not be able to see through the wheel set because the blank position of one of the wheels 55 may correspond with the line of sight of the sensor. In this case, all the wheels are turned around one character position at a time until sensor A can see through the wheel set. When this condition is met, each wheel can be homed as follows.

One wheel 55 at a time is turned slowly until the blank position covers the line of sight of sensor A. In this condition, the wheel in question is now a known distance from the home position and the wheel is then driven to that position. Each wheel is homed in this manner. Sensor B is arranged so that it corresponds with the home hole position when the wheels are at home. In this way, sensor B can be used to confirm positively that all wheels have been successfully homed so that printing may commence. The home position is best placed one character move away from the position where the blank position covers sensor A. With such an arrangement each wheel must be driven the minimum distance to its home position from sensing the blank position.

The above method works for all cases where the number of wheels is less than the number of character positions. Thus, for the 20 position wheel shown in FIG. 6, a row of 19 wheels could be homed. Should the desired number of wheels equal or exceed the number of character positions, it is possible that, on initializing, all possible light paths through the wheel set are covered. In this instance, more holes can be provided and the wheel stepped in appropriately finer increments until a light path is found, Homing each wheel can then take place as previously described.

Figure 8A:
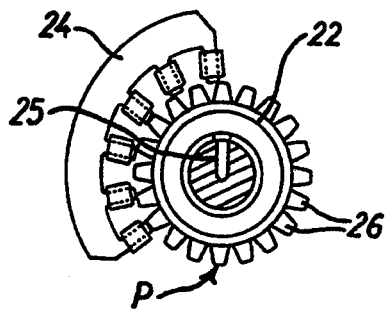
Figure 8B:
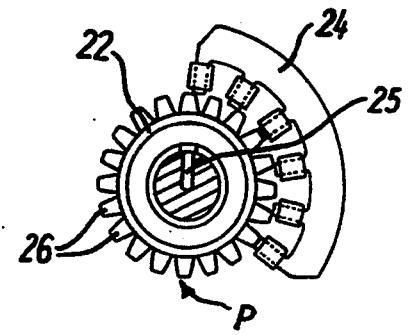
Figure 9:
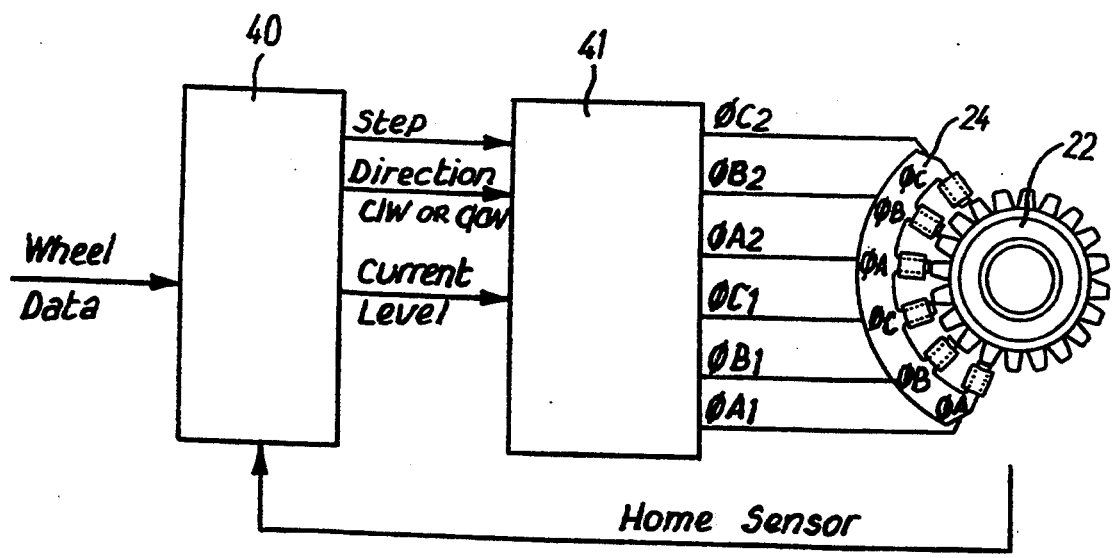

In an alternative arrangement shown in FIGS. 8a, 8b and 9, which correspond respectively to FIGS. 4a, 4b and 5, the stator windings are carried in three pairs φA φB and φC rather than in individual sets as shown in the embodiment of FIGS. 4a, 4b and 5. Equivalent parts in the two embodiments bear the same reference numerals. The stator of each motor extends circumferentially around only a part of the rotor and the individual stators of adjacent rotors are circumferentially staggered to provide room for the stator windings displaced from the print position.

In order to maximise the acceleration performance of the motor, it is important to ensure that the available torque is fully utilized. Optimum timing of the switching of the windings according to the position of he rotor facilitates this. Thus it is advantageous to be able to monitor the position of the rotor during rotation.

Referring again to FIG. 5, a method for achieving this is to use a hall-effect sensor 60, together with a small magnet 61. When positioned adjacent to the rotor 22, the output signal will vary as a function of rotor tooth position. This signal is then used as incremental position feedback for the control system. Two sensors can be used to give direction as well as incremental feedback.

Other methods that could be used to provide position feedback in this arrangement include magneto-resistive, inductive proximity and feedback coils on the stator tooth tips.

It will be appreciated that the above embodiments have been described by way of example only and that many variations are possible without departing from the scope of the invention. For example, although the stepping motor has been described with particular reference to printing, it could also be used in other processes. Also, although a rotational motor has been described, the invention may equally well employ a linear motor.

We claim:

1. Apparatus comprising a plurality of wheels arranged in a row, each wheel comprising a plurality of formations at equidistantly spaced positions around the wheel at a particular radius except for one position, known as a blank position, where the formation is missing, each wheel further including a home formation disposed adjacent the blank position but on a different radius, each wheel being movable relative to the others into one of a plurality of positions in which a processing member of each wheel is disposed at a processing point, one of said plurality of positions being designated a home position, each wheel being formed such that a sensor beam is transmitted through aligned formations in order to determine the home position of each wheel, said apparatus further comprising two position sensors which are disposed respectively on said particular radius and said different radius, respectively.

2. The apparatus as claimed in claim 1, in which the formations comprise slots, recesses or apertures.

3. The apparatus as claimed in claim 1, in which each sensor comprises an emitter and a receiver disposed respectively on opposite sides of the wheels.

4. The apparatus of claim 1 further comprising a motor for rotating each of said wheels, each motor comprising a stator assembly wherein each wheel comprises an associated rotor which is rotatable by said respective stator assembly.

5. The apparatus as claimed in claim 4 wherein said motor is a stepper motor.

6. In the apparatus of claim 1 said wheels comprising printing wheels wherein said processing members comprise print characters.

7. In the apparatus of claim 4, said stator assembly of each motor extending over only part of a circumference of each associated wheel.

8. The apparatus of claim 7, wherein individual stator windings of adjacent motors are interleaved around a remaining circumference of each associated wheel.

9. The apparatus of claim 6 further including a control system comprising control electronics and drive electronics operative to receive desired print character information and to rotate each associated wheel to a selected printing position.

10. The apparatus of claim 1 further comprising means for monitoring a position of each wheel.

11. In the apparatus of claim 10, said means for monitoring comprising a hall-effect sensor, and a small magnet positioned adjacent the wheel which in operation produces an output signal varying with wheel position and means for feeding the output signal back to a control system.

* * * * *